(No Model.)

J. S. OAKLEY.
NUT LOCK.

No. 565,142. Patented Aug. 4, 1896.

WITNESSES:

INVENTOR
James S. Oakley
BY
ATTORNEYS.

UNITED STATES PATENT OFFICE.

JAMES S. OAKLEY, OF MONTCLAIR, NEW JERSEY.

NUT-LOCK.

SPECIFICATION forming part of Letters Patent No. 565,142, dated August 4, 1896.

Application filed December 6, 1895. Serial No. 571,259. (No model.)

*To all whom it may concern:*

Be it known that I, JAMES S. OAKLEY, a citizen of the United States, and a resident of Montclair, in the county of Essex and State of New Jersey, have invented certain new and useful Improvements in Nut-Locks, of which the following is a specification, reference being had to the accompanying drawings, forming a part thereof, in which similar letters of reference indicate corresponding parts.

This invention relates to nut-locks; and the object thereof is to provide an improved device of this class which is adapted for use in connection with the spindles of buggies, wagons, carriages, and other vehicles, and which may also be employed in most places where a device of this kind is required.

The invention is fully disclosed in the following specification, of which the accompanying drawings form a part, in which—

Figure 1:
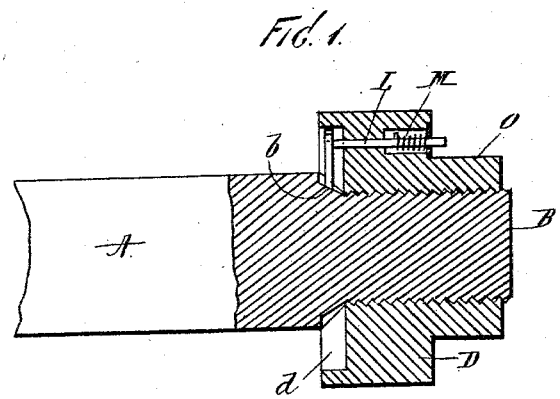
Figure 2:
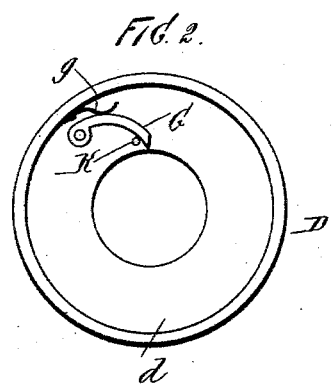
Figure 3:
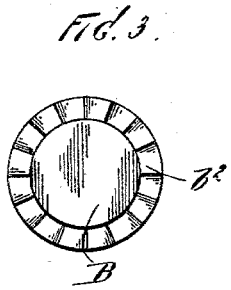

Figure 1 is a sectional side view of the spindle of a buggy or other vehicle provided with a spindle-nut which involves my invention; Fig. 2, an inner end view of the nut, and Fig. 3 an outer end view of the spindle.

In the drawings forming part of this specification, A represents the spindle of the axle of a vehicle, or it may represent a rod or bar of any desired form and adapted for use in any desired relation, and in the practice of my invention I form on the end thereof a screw-threaded extension B, which is smaller in diameter than the spindle, and the shoulder $b$ at the inner end of said extension is preferably inclined and provided with ratchet-teeth $d^2$. I also provide a nut D, which is provided with a central screw-threaded bore, and the inner end of which is cut away to form an annular chamber $d$, and pivotally connected with the inner wall of said annular chamber $d$ is a spring-actuated pawl G, the spring $g$ by which said pawl is actuated being connected with the rim of the nut formed by the annular chamber $d$, and said pawl is adapted to rest upon the pin K, said pin being adapted to prevent the pawl from dropping too far inwardly or into the central bore of the nut. I also provide a spring-operated bolt or plunger L, which is adapted to press upon the inner side of the pawl and to press the same outwardly, as will be readily understood, and the spring by which said plunger is operated is shown at M and located within the chamber formed in the outer end of the nut, and said outer end of the nut is preferably provided with an extension O.

The operation will be readily understood from the foregoing description when taken in connection with the accompanying drawings.

When the nut D is screwed onto the extension B, the pawl C operates, in connection with the ratchet-teeth $b^2$, to prevent the nut from turning in the reverse direction, and said pawl is pressed inwardly and held in contact with said teeth by a spring-operated bolt or plunger L; and it will thus be seen that I provide a simple and effective nut-lock, and one which is comparatively inexpensive, while being well adapted to accomplish the result for which it is intended.

It will be understood that the operation of the bolt or plunger L is to force the pawl against the inclined teeth, and in order to unlock the nut or turn it off it is only necessary to raise the pawl out of connection with said teeth, as will be readily understood, after which the nut may be taken off in the usual manner.

Having fully described my invention, I claim as new and desire to secure by Letters Patent—

1. The combination with a spindle, rod or bolt, having a screw-threaded extension at one end, and an annular shoulder formed thereby which is provided with inclined ratchet-teeth; of a nut adapted to be mounted on said screw-threaded extension and provided with a pawl which is adapted to operate in connection with said ratchet-teeth to prevent the reverse movement of the nut, substantially as shown and described.

2. The combination with a spindle, rod or bolt having a screw-threaded extension at one end, and an annular shoulder formed thereby which is provided with inclined ratchet-teeth; of a nut adapted to be mounted on said screw-threaded extension and provided with a pawl which is adapted to operate in connection with said ratchet-teeth to prevent the reverse movement of the nut, said pawl being pivotally connected with said nut and mounted in a circular chamber formed in the inner end thereof, substantially as shown and described.

3. The combination with a spindle rod or bolt, having a screw-threaded extension at one end, and an annular shoulder formed thereby which is provided with inclined ratchet-teeth; of a nut adapted to be mounted on said screw-threaded extension and provided with a pawl which is adapted to operate in connection with said ratchet-teeth to prevent the reverse movement of the nut, said pawl being pivotally connected with said nut and mounted in a circular chamber formed in the inner end thereof, said nut being provided with a spring-operated plunger, which passes through the side thereof, and is adapted to bear on the inner side of said pawl, substantially as shown and described.

In testimony that I claim the foregoing as my invention I have signed my name, in presence of the subscribing witnesses, this 4th day of December, 1895.

JAMES S. OAKLEY.

Witnesses:
C. GERST,
S. L. HAWKSHURST.